(12) United States Patent
Haimer

(10) Patent No.: US 9,802,256 B2
(45) Date of Patent: Oct. 31, 2017

(54) SCREW-IN TOOL AND TOOL HOLDER FOR SUCH A SCREW-IN TOOL

(71) Applicant: FRANZ HAIMER MASCHINENBAU KG, Igenhausen (DE)

(72) Inventor: Franz Haimer, Igenhausen (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 0 days.

(21) Appl. No.: 14/672,407

(22) Filed: Mar. 30, 2015

(65) Prior Publication Data

US 2015/0202690 A1 Jul. 23, 2015

Related U.S. Application Data

(63) Continuation-in-part of application No. 14/376,738, filed as application No. PCT/EP2013/051243 on Jan. 23, 2013.

(30) Foreign Application Priority Data

Feb. 7, 2012 (DE) ........................ 10 2012 100 976

(51) Int. Cl.
*B23B 31/11* (2006.01)
*B23B 31/00* (2006.01)

(52) U.S. Cl.
CPC ........ *B23B 31/1115* (2013.01); *B23B 31/006* (2013.01); *B23C 2210/02* (2013.01);
(Continued)

(58) Field of Classification Search
CPC ... B23B 31/11; B23B 31/107; B23B 31/1115; B23B 31/006; B23B 31/1107;
(Continued)

(56) References Cited

U.S. PATENT DOCUMENTS

| 1,569,862 | A | * | 1/1926 | Lapointe | ................ | B23D 37/04 |
| | | | | | | 409/282 |
| 1,749,633 | A | * | 3/1930 | Forberg | ................ | B23D 37/16 |
| | | | | | | 279/97 |

(Continued)

FOREIGN PATENT DOCUMENTS

| DE | 3912503 A1 | 3/1990 |
| DE | 102005012025 A1 | 12/2006 |

(Continued)

OTHER PUBLICATIONS

Machine translation, German patent document description, DE 102005012025A1, "Tool adjuster e.g. for generating clutch connections, has male and female clutch elements and male member has thread stump which extends into opening of female member.", Heule, H., Dec. 7, 2006.*

(Continued)

*Primary Examiner* — Eric A Gates
*Assistant Examiner* — Chwen-Wei Su
(74) *Attorney, Agent, or Firm* — Paul D. Bianco; Gary S. Winer; Fleit Gibbons Gutman Bongini & Bianco PL

(57) ABSTRACT

A screw-in tool and a tool holder for such a screw-in tool. The screw-in tool contains a tool head and a tool shank having an outer thread and a supporting region arranged between the tool head and the outer thread. The supporting region is formed by two conical bearing faces having different cone angles.

17 Claims, 5 Drawing Sheets

(52) U.S. Cl.
CPC ......... *B23C 2240/32* (2013.01); *Y10T 279/16* (2015.01); *Y10T 279/17931* (2015.01); *Y10T 408/907* (2015.01); *Y10T 408/90993* (2015.01)

(58) Field of Classification Search
CPC ......... B23B 31/1122; B23B 2260/1381; Y10T 279/16; Y10T 408/90993
See application file for complete search history.

(56) References Cited

U.S. PATENT DOCUMENTS

| | | | |
|---|---|---|---|
| 2,060,889 A * | 11/1936 | Nilsson | B23D 43/005 407/18 |
| 2,079,692 A | 5/1937 | Lapointe | |
| 2,669,468 A | 2/1954 | Clerke | |
| 3,087,360 A | 4/1963 | Garberding | |
| 4,192,533 A | 3/1980 | Blose | |
| 5,163,790 A | 11/1992 | Vig | |
| 5,873,687 A | 2/1999 | Watanabe | |
| 7,153,071 B2 | 12/2006 | Blomberg et al. | |
| 7,341,409 B2 | 3/2008 | Jonsson et al. | |
| 7,374,376 B2 | 5/2008 | Jonsson et al. | |
| 7,694,835 B1 | 4/2010 | Montgomery | |
| 8,322,258 B2 | 12/2012 | Haimer | |
| 8,690,500 B2 | 4/2014 | Spichtinger et al. | |
| 2001/0041089 A1 | 11/2001 | Hecht | |
| 2002/0021945 A1 | 2/2002 | Harpaz et al. | |
| 2003/0143044 A1 | 7/2003 | Rothenstein | |
| 2006/0072977 A1 | 4/2006 | Jonsson et al. | |
| 2006/0073744 A1 | 4/2006 | Jonsson et al. | |
| 2007/0104549 A1 * | 5/2007 | Hecht | B23D 77/006 408/233 |
| 2007/0248421 A1 * | 10/2007 | Kakai | B23B 31/1107 407/34 |
| 2011/0081212 A1 | 4/2011 | Spichtinger et al. | |
| 2012/0208147 A1 * | 8/2012 | Krumsiek | A61C 3/02 433/144 |
| 2013/0071196 A1 | 3/2013 | Oettle | |
| 2014/0308082 A1 * | 10/2014 | Abe | B23B 31/1122 407/37 |
| 2014/0360334 A1 * | 12/2014 | Singer-Schnoeller | B23B 31/11 83/698.11 |

FOREIGN PATENT DOCUMENTS

| | | |
|---|---|---|
| DE | 102009048010 B3 | 2/2011 |
| DE | 102010028561 A1 | 11/2011 |
| FR | 1019411 A | 1/1953 |
| FR | 2602162 A1 * | 2/1988 ......... B23B 31/1107 |
| WO | 2006033616 A1 | 3/2006 |
| WO | 2006033617 A1 | 3/2006 |

OTHER PUBLICATIONS

Office Action dated Nov. 30, 2015 for U.S. Appl. No. 14/376,738.
International Preliminary Report on Patentability dated Aug. 12, 2014 for International Application No. PCT/EP2013/051243, filed Jan. 23, 2013.
Written Opinion dated Aug. 7, 2014 for International Application No. PCT/EP2013/051243, filed Jan. 23, 2013.
International Search Report for PCT/EP2013/051243 dated Mar. 22, 2013.
German Office Action dated Sep. 18, 2013 for Application No. 10 2012 100 976.7.
Search Results of German patent application No. 10 2012 100 976.7, filed Feb. 7, 2012.
Search Report and Written Opinion dated Aug. 4, 2015 from the Intellectual Property Office of Singapore.
Final Office Action dated Mar. 13, 2017 in U.S. Appl. No. 14/376,738.
Final Office Action dated Jun. 9, 2016 in U.S. Appl. No. 14/376,738.
Office Action dated Nov. 17, 2016 in U.S. Appl. No. 14/376,738.
Response filed Mar. 28, 2016 in U.S. Appl. No. 14/376,738.
Second Preliminary Amendment filed Feb. 9, 2015 in U.S. Appl. No. 14/376,738.
RCE Reply filed Oct. 10, 2016 in U.S. Appl. No. 14/376,738.
RCE Reply filed Jul. 10, 2017 in U.S. Appl. No. 14/376,738.

* cited by examiner

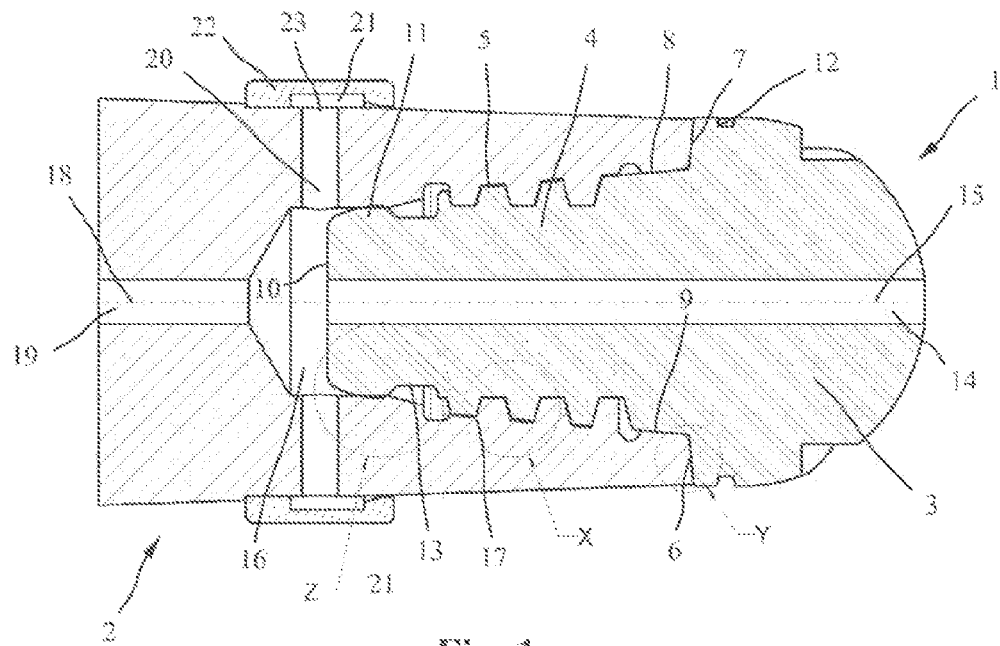
Fig. 1
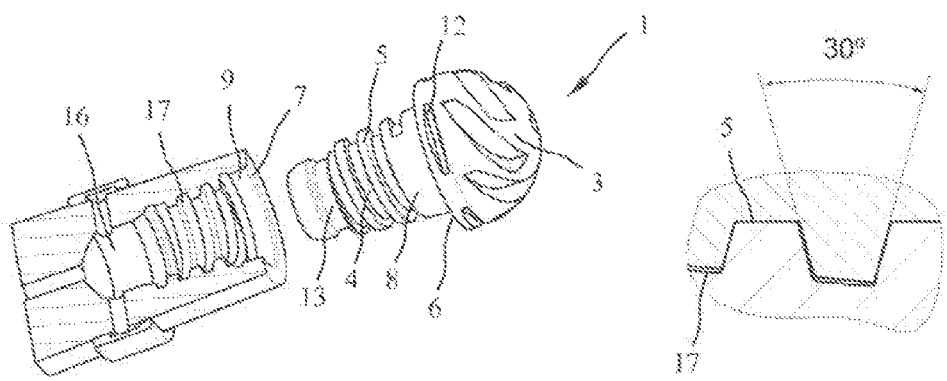
Fig. 2
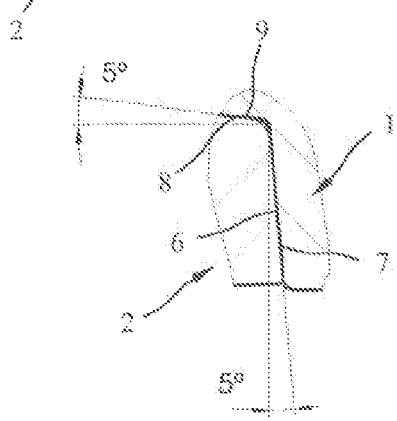
Fig. 3
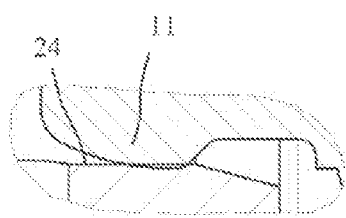
Fig. 4
Fig. 5

SCREW-IN TOOL AND TOOL HOLDER FOR SUCH A SCREW-IN TOOL

FIELD OF THE INVENTION

The invention concerns a screw-in tool. The invention also concerns a tool holder for such a screw-in tool and a tool arrangement with the screw-in tool and the tool holder.

BACKGROUND OF THE DISCLOSURE

From WO 2006/033617 A1, a screw-in tool is known, which contains a tool head and a tool shank with an outer thread, and a first supporting region situated between the tool head and the outer thread. In this known screw-in tool, the first supporting region is constructed either as a radial bond with a plane surface and a cylindrical inner bearing face or as a conical bearing face. In the first alternative, a precise axial positioning of the screw-in tool is attained within a holder via the plane surface of the radial bond; however, the centering effect via the cylindrical bearing face is limited. A better centering effect can be attained via the conical bearing face, but the outer wall of the tool holders can be deformed as a result of the wedge effect of the conical bearing face outward, which can have a negative effect on the axial alignment.

SUMMARY OF THE INVENTION

The goal of the invention is to create a screw-in tool, a tool holder for such a screw-in tool, and a tool arrangement with a tool holder and a screw-in tool that make possible an accurately positioned and reproducible holder and a mounting of a screw-in tool.

In the screw-in tool in accordance with the invention, the supporting region, situated between the tool head and the outer thread, is formed by two conical bearing faces with different cone angles. In one embodiment, the supporting region is formed by a first conical bearing face, which is adjacent to the tool head, at an inner angle of 80° to 89° with the axis of rotation, and a second conical bearing face, at an inner angle of 1.5° to 7° with the axis of rotation.

Also, with the tool holder belonging to the screw-in tool, the supporting region, situated between a front side of the tool holder and an inner thread, is formed by two conical contact surfaces with different cone angles. In this way, a supporting region with a double cone is created that provides an enlarged contact surface opposite a face contact or a straight bearing face, and makes an improved centering and supporting effect possible. In one embodiment, the supporting region is formed by a first conical contact surface adjacent to the front side of the tool holder, with an inner angle of 80° to 89° with the axis of rotation, and a second conical contact surface, at an inner angle of 1.5° to 7° with the axis of rotation.

The first conical bearing face of the screw-in tool, adjacent to the tool head, and the corresponding first conical contact surface on the front side of the tool holder preferably have a relatively large cone angle. Here, a cone angle of 170° turned out to be favorable. In a preferred development, the second conical bearing face follows this contact surface on the screw-in tool and the corresponding second conical contact surface, the tool holder. This second bearing face and the corresponding second contact surface preferably have relatively small cone angles. Here, a cone angle of 10° has turned out to be favorable. However, it is also possible to provide, for example, an intermediate cylindrical area between the two conical surfaces. A double cone of the described type with different cone angles has the advantage that the small cone angle makes possible a good centering of the screw-in tool in the tool holder, and the large cone angle makes possible an additional centering but with greatly reduced spreading forces on the tool holder. In addition, the rigidity of the tool is increased by the first conical bearing face, since the tool cannot slide off with a radial load, as is the case with a plane bearing face.

For the orientation of the first conical bearing face and the corresponding first conical contact surface, two models are thereby possible. In a first preferred development, the diameters of these conical surfaces are reduced in the screwing direction of the tool, that is, the cones which underlie the two cone surfaces forming the double cone point in the same direction. In this embodiment, a slight spreading of the tool holder by the conical surfaces is possible. In comparison to a plane axial bearing face, the thread pretension rises less with the screwing angle and thus, a more exact adjustment of the pretension during the assembly of the screw-in tool is possible. Since the screw-in tools are mostly produced as a unit from very hard materials, the elastic deformation of the thread that is needed for the thread locking is largely restricted to the deformation of the inner thread of the tool holder. So as to have as long as possible a service life with such a tool holder, an exact adjustment of the thread pretention is therefore extremely important. With a double cone of the described type, an exact adjustment pretension is made possible because it can be adjusted better. In another possible development, the diameters of the first conical bearing face and the corresponding first conical contact surface increase in the screwing direction of the tool, that is, the cones that underlie the two conical surfaces forming the double cone point in the opposite directions. With such a development of the double cone, a spreading of the tool holder is counteracted, since the radial forces caused by the conical surface act in opposition. The special advantage of this development is that with the reduced spreading of the tool holder, a better conclusion regarding the screwing torque on the thread pretension is made possible and thus, a more exact adjustment of the thread pretension with the advantages described above.

In a further advantageous manner, another supporting region with a bearing area or with another contact area is provided on the free end of the tool shank, and correspondingly also on the inner end of the holder opening of the tool holder. This additional bearing area on the tool shank of the screw-in tool can, for example be designed spherical, whereas the other corresponding contact area on the tool holder can be made as a cylindrical contact surface. With the spherical bearing area and the cylindrical contact surface, an only partial contact is attained in this area between the screw-in tool and the tool holder. Appropriately, the additional spherical bearing area has an excess, in comparison to the cylindrical contact surface, so that the pretension in this additional supporting region is independent of the screwing depth. There are also, however, other conceivable developments of the additional supporting region. Thus, spherical, conical, or cylindrical bearing faces or contact surfaces can be provided on the tool and the tool holder in arbitrary combinations as well.

The outer thread on the screw-in tool and the corresponding inner thread on the tool holder appropriately have a thread depth that declines toward the free end of the tool shank or toward the inner end of the holder opening. The threads, however, can also have a constant thread depth.

For the outer thread and the corresponding inner thread, trapezoidal threads or flat threads have proved to be particularly appropriate. However, the threads can also be designed as conical threads, round threads, buttress threads, or the like.

In another advantageous development, a threaded insert is provided, which is inserted into the tool holder. This threaded insert can contain the contact surfaces of the first and second supporting regions and the thread, but also only a part of these elements. By selecting a suitable material for the threaded insert, a vibration dampening can be attained. Furthermore, the tool holder can also be produced from solid, but brittle, hard metal, and the threaded insert with the thread, from soft, but rather elastic steel, which is favorable for a secure locking of the screw connection. Moreover, the tool holder can be adapted by different threaded inserts for the holder of different configurations of tools. The threaded insert can consist of one part or of several parts, which can also be made of various materials.

In order to simplify the production of the screw-in tool, a gripper groove for the clamping of the screw-in tool can be provided on the tool shank. Pincer-shaped gripper elements of a clamping device, for example, for the clamping of the tool in the tool holder, can grip the gripper groove. The tool and the tool holder can be provided with an antirotation lock when clamping with the aid of the gripper groove.

The tool holder can be made, for example, of steel, hard metal, aluminum, or a fiber composite, in particular, glass or carbon fibers.

BRIEF DESCRIPTION OF THE DRAWINGS

Special features and qualities of the invention can be deduced from the following description of preferred embodiment examples with the aid of the drawings. The figures show the following:

FIG. 1, a tool holder and a screw-in tool in a longitudinal section;

FIG. 2, the tool holder and the screw-in tool of FIG. 1 in a perspective view;

FIG. 3, a detailed view X of FIG. 1;

FIG. 4, a detailed view Y of FIG. 1;

FIG. 5, a detailed view Z of FIG. 1;

DETAILED DESCRIPTION OF THE INVENTION

Figure 6:
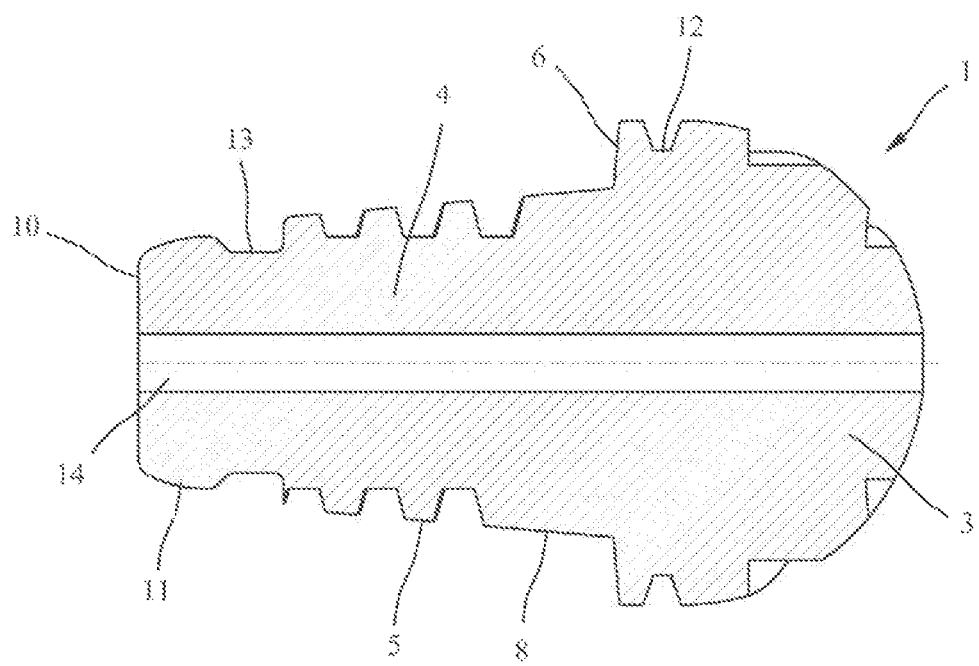
FIG. 6, a screw-in tool with a trapezoidal thread.
Figure 7:
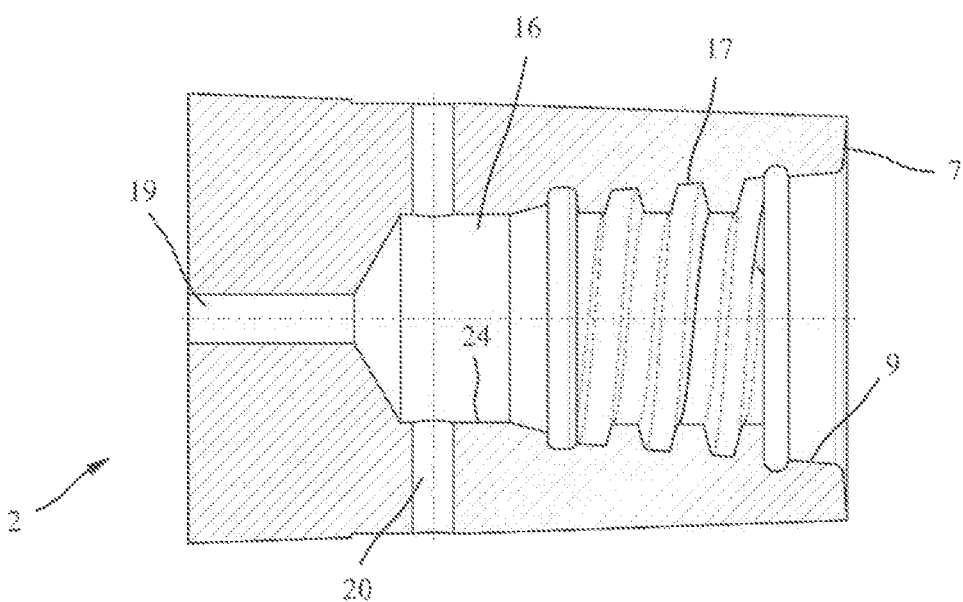
FIG. 7, a screw-in holder for a screw-in tool according to FIG. 6.

FIGS. 1 and 2 show a tool arrangement with a screw-in tool 1 and a corresponding tool holder 2 in a longitudinal section and a perspective view. The screw-in tool 1 has a tool head 3, which is designed here as a spherical-head cutter, and a tool shank 4, which tapers conically toward the rear, with an outer winding 5. A first supporting region with a first conical bearing face 6 is provided between the tool head 3 and the outer winding 5 for the placement on a counter-conical contact surface 7 on a front side of the tool holder 2, and a second conical bearing face 8 for the placement on a second conical contact surface 9 in the interior of the tool holder. In this way, a double cone, which ensures an improved centering and an increased supporting effect, is produced on the transition between the tool head 3 and the outer winding 5. A second supporting region 11 is found on a free rear end 10 of the tool shank 4.

As can be seen particularly from FIG. 2, the tool head 3 has, on its outside, several key surfaces 12 distributed over the circumference for the screwing in of the screw-in tool 1 into the tool holder 2. The key surfaces 12 can also be used for the automatic tool change in the cutter. There is also a gripper groove 13 in the rear area of the tool shank 4 for the automatic clamping of the screw-in tool 1 in the tool holder 2 between the rear end of the outer thread 5 and the second rear supporting region 11. Pincer-like gripper elements of a clamping device, for example, can grip into the gripper groove 13, so as to be able to securely grip or hold the screw-in tool 1 in the tool holder 2. A central passage opening 14, which can be seen in FIG. 1, also runs through the screw-in tool 1, and it is possible to conduct the cooling lubricant, the compressed air, or another work fluid through this passage opening to the processing area. The passage opening 14 is situated coaxial to the middle axis 15 of the screw-in tool 1, but other arrangements, for example, with genuinely parallel or angular longitudinal axes are also possible, however.

The tool holder 2 belonging to the screw-in tool 1 has a holder opening 16 with an inner thread 17. An outer supporting region with the first contact surface 7 for placement on the first bearing face 6 and with the second contact surface 9 for placement on the second bearing face 8 of the screw-in tool 1 is provided on the front side of the tool holder 2. A supply opening 19, coaxial to its middle axis 18, for the supply of a work fluid to the passage opening 14 of the screw-in tool 1 is also located in the tool holder 2, wherein here also, another arrangement comparable to the passage opening 14 is possible. Radial boreholes 20 can also be located in the tool holder 2; they open into the holder opening 16 or also into the supply 19. A sleeve 22, provided with an annular groove 21 on the inside for the outer cooling agent supply can be situated on the outside of the tool holder 2. The annular groove 21 can likewise, however, also be formed on the tool holder 2.

In the embodiment shown in FIGS. 1-7, the outer thread 5 of the screw-in tool 1 and the corresponding inner thread 17 of the tool holder 2 are constructed as a trapezoidal thread with a flank angle of 30°, shown in FIG. 3. The outer thread 5 of the screw-in tool 1 and the corresponding inner thread 17 of the tool holder 2 can, however, also be constructed as a trapezoidal thread with other flank angles. In contrast to the traditional threads, in which the thread turns have a constant thread depth, the outer thread 5 used here has a thread depth which declines from the tool head 3 toward the free rear end 10 of the tool shank 4. Also, with the inner thread 17 of the tool holder 2, the thread depth declines from the second contact surface 9 toward the second supporting region 11.

From FIG. 4, it can be seen that the first bearing face 6 of the screw-in tool 1 and the corresponding first contact surface 7 of the tool holder 2 are inclined by 5° relative to a plane that is vertical with respect to the middle axes 15 and 18, in the direction of the front end of the tool head 3. In this way, the first conical bearing face 6 and also the first conical contact surface 7 have a cone angle of at least 140° and a maximum 179°, but preferably 170°. The diameter of the second conical bearing face 8 of the screw-in tool 1 and the diameter of the second conical contact surface 9 of the tool holder 2 taper in the screw-in direction, so that the result is a cone angle of at least 1° and a maximum of 90°, but preferably 10°, which means an angle of the cone surfaces of 5° relative to the middle axes 15 and 18.

The second supporting region 11 of the screw-in tool 1 is designed with a spherical shape in accordance with FIG. 5 and is placed on a cylindrical bearing face 24 at the end of the holder opening 16. The cylindrical bearing face 24 forms another inner bearing area in the tool holder. The spherical supporting region 11 ensures an only parallel contact between the screw-in tool 1 and the tool holder 2. Appropriately, the second spherical supporting region 11 has an excess in comparison to the cylindrical bearing face 24, so that the pretension in this second supporting region is independent of the screwing depth.

Figure 8:
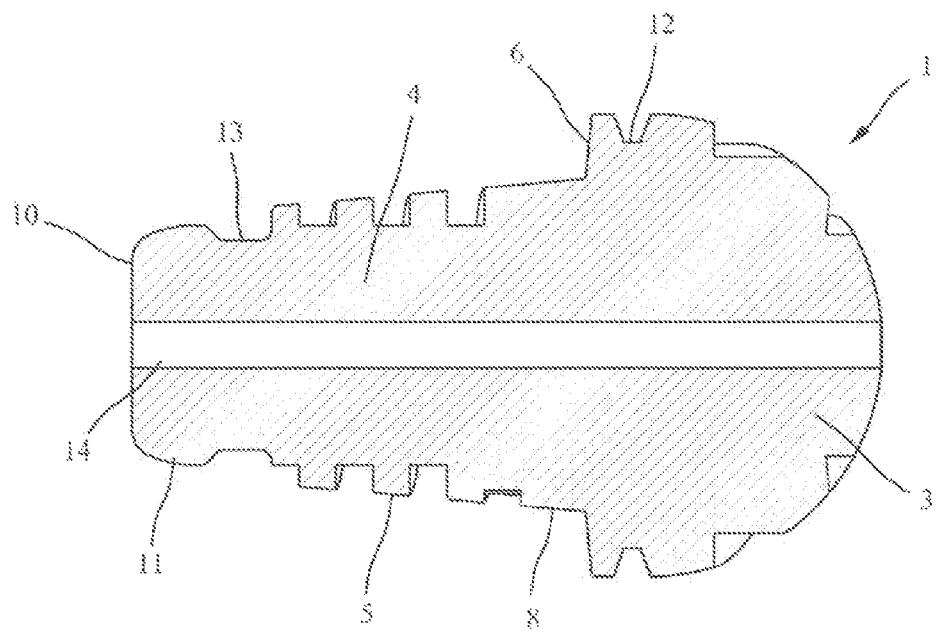
FIG. 8, a screw-in tool with a flat thread.
Figure 9:
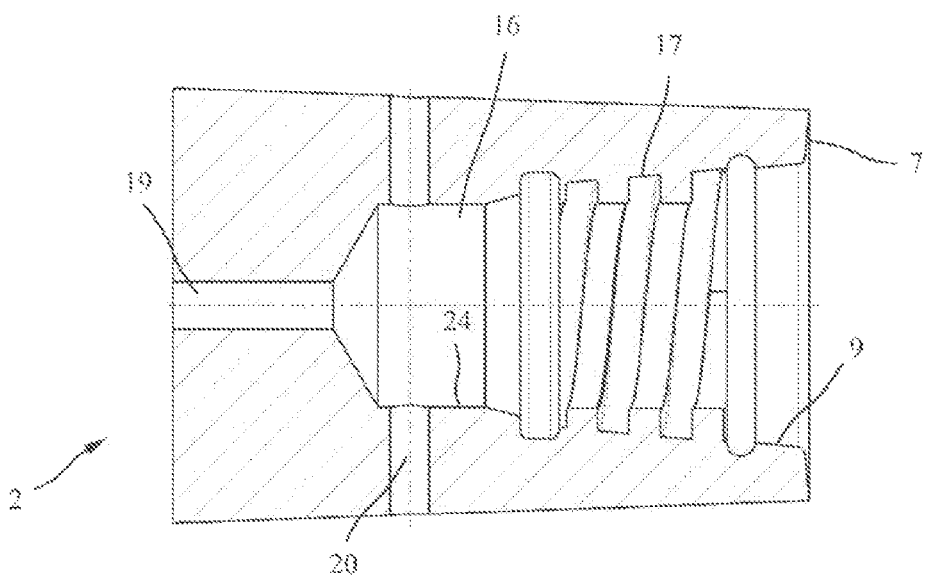
FIG. 9, a tool holder for a screw-in tool according to FIG. 8.

Another embodiment example of a screw-in tool 1 and a corresponding tool holder 2 is shown in FIGS. 8 and 9. In contrast to the embodiment of FIGS. 6 and 7, the outer thread 5 of the screw-in tool 1 and the inner thread 17 of the tool holder 2 are constructed as flat threads in this embodiment example. Otherwise, this embodiment corresponds to the previous embodiment example, so components that correspond to one another are also provided with the same reference symbols. In this embodiment also, the outer thread 5 used here has a thread depth that declines from the tool head 3 toward the free end 10 of the tool shank 4. Furthermore, here too, the thread depth declines from the second contact surface 9 toward the second supporting region 11 in the inner thread 17 of the tool holder 2.

Figure 10:
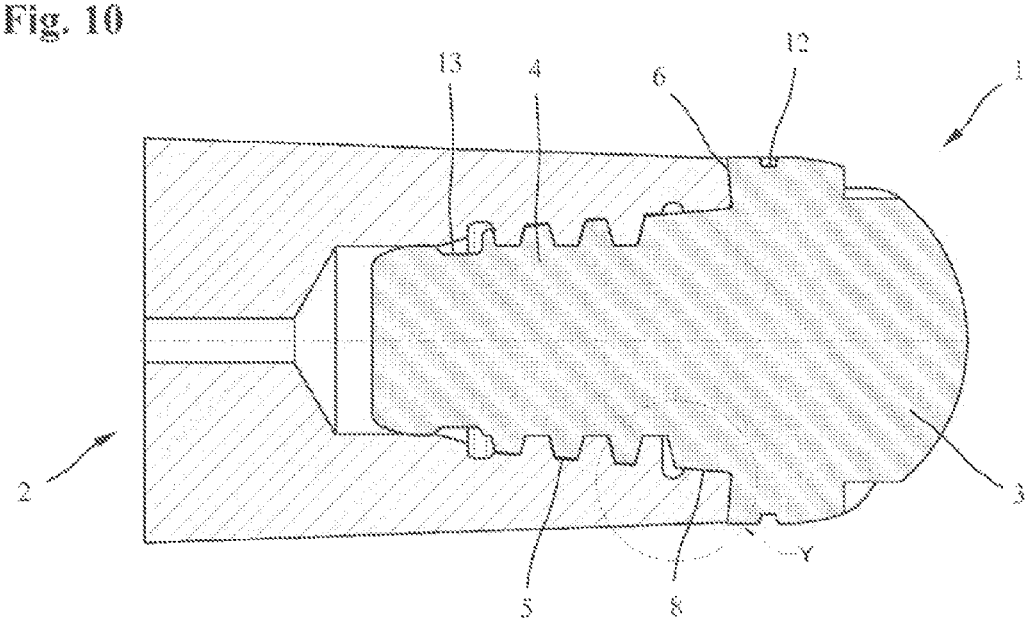
FIG. 10, another embodiment example of a screw-in tool with a trapezoidal thread.
Figure 11:
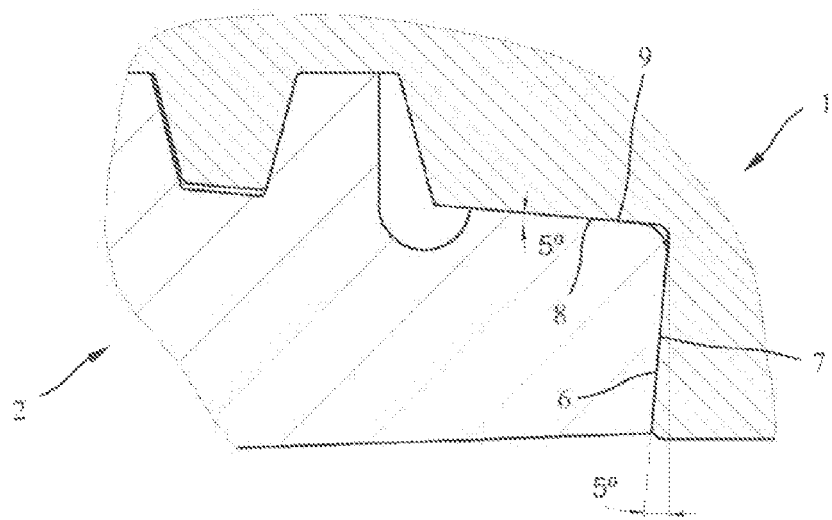
FIG. 11, an enlarged partial view Y of FIG. 10.

FIGS. 10 and 11 show an embodiment example in which the diameters of the conical first bearing face 6 of the screw-in tool 1 and the corresponding conical first contact surface 7 of the tool holder 2 expand in the screwing direction of the screw-in tool 1. The first bearing face 6 and the corresponding first contact surface 7 are inclined around 5°, relative to the plane, vertical to the middle axes 15 and 18, in the direction of the tool shank 4. In this way, the first conical bearing face 6 and also the first conical contact surface 7 have a cone angle of 170°, just as in the embodiment example from FIG. 4. The second conical bearing face 8 and the second conical contact surface 9 taper at an angle of 5° relative to the middle axes 15 and 18, so that a cone angle of 10° is produced. In contrast to the embodiments of FIGS. 1-9, the cones that underlie the two conical surfaces forming the double cone point in opposite directions.

Figure 12:
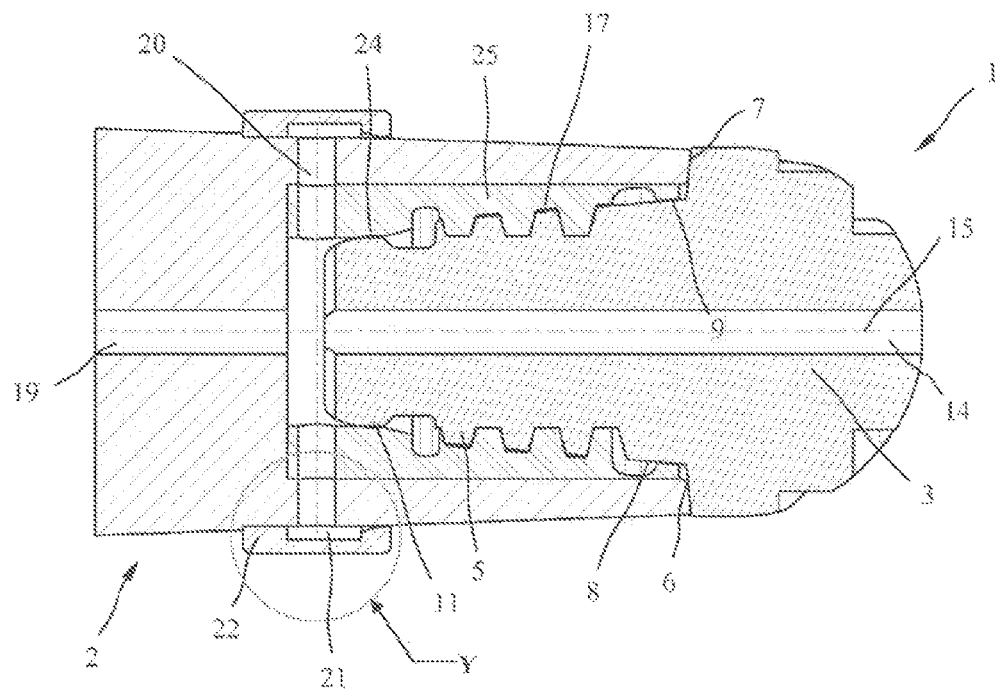
FIG. 12, another embodiment example of a tool holder and a screw-in tool in a longitudinal section.

FIG. 12 shows an embodiment example in which a threaded insert 25, which contains the second conical contact surface 9, the inner thread 17, and the cylindrical bearing face 24, is inserted into the holder opening 16 of the tool holder 2. The radial boreholes 20 go through the tool holder 2 and the threaded insert 25 and lead into the holder opening 16 of the tool holder 2.

Figure 13:
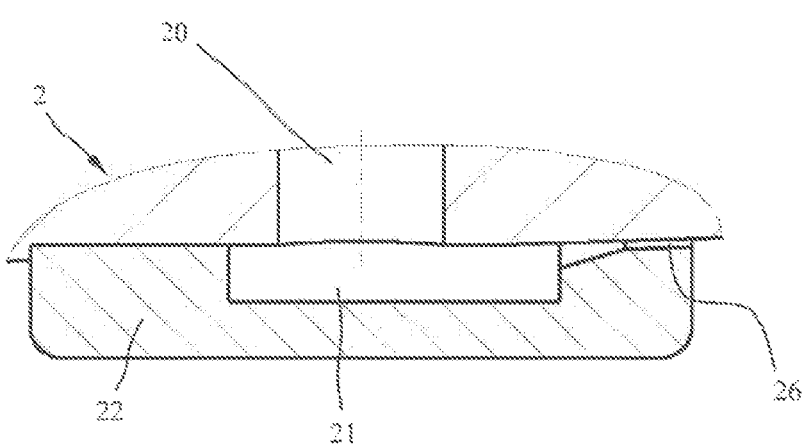
FIG. 13, an enlarged partial view Y of FIG. 12.

FIG. 13 shows an enlarged representation of the sleeve 22 for the outer cooling agent supply. In the direction of the tool, the sleeve 22 has one or more outlets 26, through which the cooling agent guided outward via the radial boreholes 20 and exiting through the outer openings 23 can be conducted to the tool or to the site to be processed. The exit(s) 26 can be designed as a surrounding slot, boreholes, slits, or the like.

In the tool arrangement according to a first advantageous form of embodiment, the thread and the corresponding mating thread can exhibit different thread contours which adjust to one another through elastic deformation when screwed together. This has the advantage that when they are screwed together, a preload is generated through one part of the thread by elastic deformation of the threads and when secured a uniform pattern of contact is obtained over the entire length of the thread. This allows the tensile strength of the entire thread to be utilized. The thread contour is to be understood to mean not the contour of a thread flank but the contour of the entire thread in the longitudinal section.

In a second advantageous form of embodiment the thread and the mating thread exhibit a different pitch. The threaded connection can then be chosen so that the thread component embodied as the external thread exhibits a smaller pitch than the corresponding internal thread. This allows the thread flanks to be elastically stretched or compressed by the screwing process in such a way that the thread contours adapt to one another. As a result the thread turns are in contact with one another in their entirety and a uniform pattern of contact can be obtained.

In a third advantageous form of embodiment the thread and the mating thread can be embodied as a tapering internal thread and external thread with different taper angles. This also allows stretching and compression of certain thread regions and hence a uniform pattern of contact for the threaded connection. In one particularly preferred form of embodiment the taper angle of the internal thread is greater than the taper angle of the external thread. The result of this specific design is that the thread turn of the external thread has a greater diameter than the corresponding turn of the internal thread. Thus, through the preferably inclined thread flanks this part of the external thread comes into contact with the internal thread first and therefore also comes under load first. When the threads are secured, this region deforms elastically and the thread contours adapt to one another. In this way a uniform pattern of contact can be obtained.

The invention is not limited to the embodiment examples described in the preceding and shown in the drawing. Thus, for example, the outer cooling agent supply with the radial boreholes and the sleeve, the gripper groove for the automatic tension in a tool machine, the threaded insert, or also the embodiment of the tool holder made of fibrous composites with screw-in tools or tool holders can be used individually or in combination, in which only simple conical, cylindrical, or plane bearing or contact surfaces or other centering or guiding possibilities are used. These embodiments are not limited to screw-in tools or holders with a double cone.

The invention claimed is:

1. A rotary tool for coupling with a rotatable threaded holder, the tool comprising:
    a tool head with a work surface and a conical first bearing surface formed in the tool head and defining a first cone angle; and
    a tool shank having a peripheral surface defining an outer periphery of the shank, the shank including an external thread integrally formed upon the peripheral surface and threadably engageable with the holder, the tool shank and the thread thereby formed as one piece, the tool shank further having a conical second bearing surface formed in the shank and defining a second cone angle, the second bearing surface positioned along the peripheral surface;
    the first and second cone angles define different angles;
    the first and second bearing surfaces are each shaped to directly contact and mate with a respective bearing surface of the holder; and
    the first and second bearing surfaces are adjacent to one another.

2. The tool according to claim 1, wherein the first bearing face forms an inner angle of 80° to 89° with respect to the axis of rotation, and the second bearing face forms an inner angle of 1.5° to 7° with respect to the axis of rotation.

3. The tool according to claim 1, wherein a third bearing face is provided on an inserted end of the tool shank and which has a spherical, cylindrical, or conical shape.

4. The tool according to claim 1, wherein the outer thread contains a thread depth that declines toward the free end of the tool shank.

5. The tool according to claim 1, wherein a gripper groove for the clamping of the rotary tool is provided on the tool shank.

6. The rotary tool of claim 1, further including a plurality of key surfaces formed in a circumference of the tool head, the key surfaces shaped to matingly engage an automated tool changer to thereby enable rotation of the tool head by the automated tool changer to securely engage the rotary tool within a tool holder.

7. The rotary tool of claim 1, wherein the thread is directly adjacent one of the two conical bearing faces.

8. A rotatable tool holder for a rotary tool, comprising:
a holder opening with a tapered threaded inner surface threadably mateable with a tapered external surface of the rotary tool;
a supporting region situated between a front side of the tool holder and the inner thread;
the supporting region formed by two conical contact surfaces with different cone angles each shaped to directly contact and mate with corresponding surfaces of the rotary tool;
cones which are defined by the two conical contact surfaces have apexes which point in the same direction; and
the two conical contact surfaces are directly adjacent to one another.

9. The tool holder according to claim 8, wherein the supporting region is formed by a first conical contact surface adjacent to the front side of the tool holder, with an inner angle of 80° to 89° with the axis of rotation, and a second conical contact surface, at an inner angle of 1.5° to 7° with the axis of rotation.

10. The tool holder according to claim 8, wherein an inner bearing surface is provided at an inner end of the holder opening, and the inner bearing surface is designed as a cylindrical, spherical or conical contact surface.

11. The tool holder according to claim 8, wherein the inner thread contains a thread depth that declines toward the inner end of the holder opening.

12. The tool holder according to claim 8, wherein the tool holder contains a threaded insert for fixing the rotary tool.

13. A tool assembly, comprising:
a rotary tool including:
a tool head having a working surface and a conical head bearing surface formed in the tool head and defining a first cone angle; and
a tool shank having a peripheral surface defining an outer periphery of the shank, the tool shank including an external thread integrally formed upon the peripheral surface, the tool shank and the thread thereby formed as one piece, the tool shank further having a conical shank bearing surface formed in the shank and defining a second cone angle, the shank bearing surface positioned along the peripheral surface;
the first and second cone angles define different angles;
cones defined by the first and second cone angles are coaxial and have apexes which point in the same direction; and
the head and shank bearing surfaces are adjacent to one another; and
a tool holder including:
a holder opening;
an inner thread formed upon a tapered inner surface of the holder and mateable with the thread of the tool shank;
a front bearing surface situated upon a front side of the tool holder mateable with the head bearing surface;
an inner bearing surface situated adjacent to the inner thread, the inner bearing surface mateable with the shank bearing surface;
the front and inner bearing surfaces defining relatively different cone angles, the front and inner bearing surfaces shaped to directly and matingly engage with the head and shank bearing surfaces; and
cones defined by the front and inner bearing surfaces point in the same direction and are adjacent to one another.

14. The tool assembly according to claim 13, further including an additional supporting region formed by an interference fit between a leading end of the rotary tool shank and the tool holder.

15. The tool assembly according to claim 13, wherein the outer thread of the rotary tool and the inner thread of the tool holder exhibit different thread contours which adjust to one another through elastic deformation when screwed together.

16. The tool assembly according to claim 13, wherein the outer thread of the rotary tool has a smaller pitch than the inner thread of the tool holder.

17. The tool assembly according to claim 13, wherein the outer thread is arranged on a threaded stem and the outer thread comprises a thread depth which decreases towards the free end of the threaded stem.

* * * * *